United States Patent
Wang et al.

(10) Patent No.: US 10,146,896 B2
(45) Date of Patent: Dec. 4, 2018

(54) METHOD FOR TRANSISTOR DESIGN WITH CONSIDERATIONS OF PROCESS, VOLTAGE AND TEMPERATURE VARIATIONS

(71) Applicant: Samsung Electronics Co., Ltd., Suwon-si, Gyeonggi-do (KR)

(72) Inventors: Jing Wang, San Jose, CA (US); Nuo Xu, Milpitas, CA (US); Woosung Choi, Pleasanton, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 33 days.

(21) Appl. No.: 15/344,346

(22) Filed: Nov. 4, 2016

(65) Prior Publication Data

US 2018/0075179 A1 Mar. 15, 2018

Related U.S. Application Data

(60) Provisional application No. 62/395,333, filed on Sep. 15, 2016.

(51) Int. Cl.
| | |
|---|---|
| *G06F 17/00* | (2006.01) |
| *G06F 17/50* | (2006.01) |
| *H01L 27/02* | (2006.01) |
| *H01L 29/06* | (2006.01) |
| *H01L 29/423* | (2006.01) |
| *H01L 29/45* | (2006.01) |

(52) U.S. Cl.
CPC ...... *G06F 17/5036* (2013.01); *G06F 17/5045* (2013.01); *H01L 27/0207* (2013.01); *H01L 29/0657* (2013.01); *H01L 29/42376* (2013.01); *H01L 29/456* (2013.01); *G06F 2217/06* (2013.01)

(58) Field of Classification Search
USPC .......................................................... 716/107
See application file for complete search history.

(56) References Cited

U.S. PATENT DOCUMENTS

| | | |
|---|---|---|
| 7,092,838 B1 | 8/2006 | Srinivas et al. |
| 7,669,150 B2 | 2/2010 | Li et al. |
| 8,281,266 B2 | 10/2012 | Jamann et al. |
| 8,446,224 B2 | 5/2013 | Cortadella et al. |
| 8,479,126 B1 | 7/2013 | Liu et al. |
| 8,494,670 B2 | 7/2013 | McConaghy et al. |

(Continued)

*Primary Examiner* — Mohammed Alam
(74) *Attorney, Agent, or Firm* — Lewis Roca Rothgerber Christie LLP (57) ABSTRACT

A method for selecting transistor design parameters. A first set of simulations is used to calculate leakage current at a plurality of sets of design parameter values, and the results are fitted with a first response surface methodology model. The first model is used to generate a function that returns a value of a selected design parameter, for which a leakage current specification is just met. A second set of simulations is used to calculate effective drive current for a plurality of sets of design parameter values, and the results are fitted with a second response surface methodology model. The second model is used, together with the first, to search for a set of design parameter values at which a worst-case effective drive current is greatest, subject to the constraint of meeting the worst-case leakage current specification.

18 Claims, 2 Drawing Sheets

(56) References Cited

U.S. PATENT DOCUMENTS

| | | |
|---|---|---|
| 9,053,276 B2 | 6/2015 | Mohanty et al. |
| 2005/0192700 A1* | 9/2005 | Holfeld ................. H01L 22/20 |
| | | 700/121 |
| 2006/0190790 A1* | 8/2006 | Pilling ............... G01R 31/2853 |
| | | 714/734 |
| 2007/0250797 A1* | 10/2007 | Engel ................. G06F 17/5036 |
| | | 716/113 |
| 2009/0217219 A1 | 8/2009 | Defregger et al. |
| 2010/0161303 A1 | 6/2010 | McGowan et al. |
| 2010/0289553 A1* | 11/2010 | Wang ............... G01R 31/31721 |
| | | 327/512 |
| 2012/0131531 A1* | 5/2012 | Tirumala ............ G06F 17/5031 |
| | | 716/113 |
| 2015/0286772 A1* | 10/2015 | Donnelly ............ G06F 17/5081 |
| | | 716/112 |

* cited by examiner

FIG. 2

METHOD FOR TRANSISTOR DESIGN WITH CONSIDERATIONS OF PROCESS, VOLTAGE AND TEMPERATURE VARIATIONS

CROSS-REFERENCE TO RELATED APPLICATION(S)

The present application claims priority to and the benefit of U.S. Provisional Application No. 62/395,333, filed Sep. 15, 2016, entitled "METHOD FOR TRANSISTOR DESIGN OPTIMIZATION WITH FULL CONSIDERATIONS FOR PROCESS-VOLTAGE-TEMPERATURE (PVT) VARIATIONS", the entire content of which is incorporated herein by reference.

FIELD

One or more aspects of embodiments according to the present invention relate to transistor design, and more particularly to a method for designing a transistor meeting specifications in the presence of process, voltage, and temperature variations.

BACKGROUND

In integrated circuit (IC) technology, transistor performance depends on process, voltage and temperature (PVT) variations, and circuit metrics (e.g., delay and leakage power) may vary significantly at different PVT corners. To achieve high yield in IC manufacturing, circuit designers may focus on the "worst-case" PVT corners, e.g., those providing the highest leakage power or the greatest delay, to ensure that the circuit metrics meet design requirements even at the worst PVT conditions. Worst-case transistor metrics may not be directly measurable from hardware, however, and transistor designers may focus on "nominal" transistor metrics for their optimization (enhancement). This discrepancy can lead to sub-optimal transistor designs from a circuit point of view.

Thus, there is a need for a method for adjusting device design parameters in integrated circuit design in a manner that takes into account worst case PVT corners.

SUMMARY

Aspects of embodiments of the present disclosure are directed toward a method for selecting transistor design parameters. A first set of simulations is used to calculate leakage current at a plurality of sets of design parameter values, and the results are fitted with a first response surface methodology (RSM) model. The first RSM model is used to generate a function that returns a value of a selected design parameter, for which a leakage current specification is just met. A second set of simulations is used to calculate effective drive current for a plurality of sets of design parameter values, and the results are fitted with a second RSM model. The second RSM model is used, together with the first, to search for a set of design parameter values at which a worst-case effective drive current is greatest, subject to the constraint of meeting the worst-case leakage current specification.

According to an embodiment of the present invention there is provided a method for fabricating a transistor meeting a leakage current specification at a plurality of operating temperatures, the method including: generating a third function, the third function being a function of a plurality of design parameters, the third function being configured to return a value of a first design parameter, the first design parameter not being one of the plurality of design parameters, the value returned by the third function being a value of the first design parameter for which a modeled leakage current equals the leakage current specification; generating a seventh function, the seventh function being a function of the plurality of design parameters, the seventh function being a model of a minimum, over the operating temperatures of the plurality of operating temperatures, of an effective drive current of the transistor: at a fast-fast process corner; and at a value of the first design parameter for which a modeled leakage current equals the leakage current specification; finding a first set of respective values for the plurality of design parameters for which the seventh function has the greatest value; and fabricating the transistor, the transistor having, as design parameters: the first set of respective values, for the plurality of design parameters; and a value returned by the third function evaluated at the first set of respective values for the plurality of design parameters, for the first design parameter.

In one embodiment, the generating of the third function includes: generating a first function, the first function being a function of: the plurality of design parameters; and the first design parameter, the first function being an approximate model of a leakage current of the transistor at a typical-typical process corner; and generating a second function, the second function being a function of: the plurality of design parameters; and the first design parameter, the second function being a model of the leakage current at a fast-fast process corner, the third function returning a value of the first design parameter for which the second function returns a value equal to the leakage current specification.

In one embodiment, the generating of the seventh function includes: generating a fourth function, the fourth function being a function of: the plurality of design parameters; the first design parameter; and the plurality of operating temperatures, the fourth function being an approximate model of an effective drive current of the transistor at a typical-typical process corner; generating a fifth function, the fifth function being a function of: the plurality of design parameters; the first design parameter; and the plurality of operating temperatures, the fifth function being a model of an effective drive current of the transistor at a slow-slow process corner; and generating a sixth function, the sixth function being a function of: the plurality of design parameters; the first design parameter; and the sixth function being a model of a minimum, over the operating temperatures of the plurality of operating temperatures, of the effective drive current of the transistor at the slow-slow process corner, the seventh function being the sixth function with the first design parameter supplied by a call to the third function.

In one embodiment, the generating of the first function includes: performing a plurality of technology computer aided design simulations, each resulting in a simulated leakage current; and generating a response surface methodology model to fit the results of the plurality of technology computer aided design simulations.

In one embodiment, the generating of the response surface methodology model includes performing a second order regression fit to the results of the plurality of technology computer aided design simulations.

In one embodiment, the generating of the second function includes calculating a plurality of numerical partial derivatives of a logarithm of the first function with respect to each of a plurality of respective independent variables, the plurality of respective independent variables including each of the plurality of design parameters and the first design parameter; and calculating an estimated variation in a logarithm of the leakage current from the numerical partial derivatives.

In one embodiment, the calculating of the estimated variation in a logarithm of the leakage current includes calculating a quadrature sum of each of a plurality of products, each of the products being a product of: a partial derivative and an estimated variation in an independent variable of the partial derivative.

In one embodiment, the generating of the second function further includes calculating a leakage current offset, the calculating of the leakage current offset including calculating an inverse logarithm of the quadrature sum.

In one embodiment, the generating of the fifth function includes: performing a plurality of technology computer aided design simulations, each resulting in a simulated effective drive current, and generating a response surface methodology model to fit the results of the plurality of technology computer aided design simulations.

In one embodiment, the generating of the response surface methodology model includes performing a second order regression fit to the results of the plurality of technology computer aided design simulations.

In one embodiment, the first design parameter is a channel doping concentration.

In one embodiment, the first design parameter is a gate work function.

In one embodiment, the plurality of design parameters includes: a length of a transistor gate; a silicon body thickness; and a source drain doping concentration.

In one embodiment, the modeled leakage current varies monotonically as a function of the first design parameter.

According to an embodiment of the present invention there is provided a method for fabricating a transistor meeting a leakage current specification at a plurality of operating temperatures, the method including: performing a first plurality of technology computer aided design simulations, for a first plurality of sets of values for: a plurality of design parameters; and a first design parameter, the first design parameter not being one of the plurality of design parameters, the first plurality of technology computer aided design simulations resulting in a plurality of respective simulated leakage currents; generating a third function, from the plurality of respective simulated leakage currents, the third function being configured to return a value of the first design parameter for which an estimated leakage current value at a fast-fast process corner is equal to the leakage current specification; performing a second plurality of technology computer aided design simulations, for a second plurality of sets of values, the second plurality of technology computer aided design simulations resulting in plurality of respective simulated effective drive currents; generating, from the plurality of respective simulated effective drive currents, a seventh function, the seventh function being a function of the plurality of design parameters; the seventh function being a model of a minimum, over the operating temperatures of the plurality of operating temperatures, of the effective drive current of the transistor: at a slow-slow process corner; and at a value of the first design parameter for which a modeled leakage current equals the leakage current specification; finding a first set of design parameter values for which the seventh function has the greatest value; and fabricating the transistor, the transistor having, as design parameters: the first set of design parameter values for the plurality of design parameters, and the value returned by the third function evaluated at the first set of design parameter values, for the first design parameter.

In one embodiment, the generating of the third function includes: generating a first function, the first function being a function of: the plurality of design parameters; and the first design parameter, the first function being an approximate model of a leakage current of the transistor at a typical-typical process corner; the generating of the first function comprising: generating a response surface methodology model to fit the plurality of respective simulated leakage currents.

In one embodiment, the generating of the third function further includes: generating a second function, the second function being a function of: the plurality of design parameters; and the first design parameter, the second function being a model of the leakage current at a fast-fast process corner, the third function returning a value of the first design parameter for which the second function returns a value equal to the leakage current specification.

In one embodiment, the generating of the seventh function includes: generating a fourth function, the fourth function being a function of: the plurality of design parameters; the first design parameter; and the plurality of operating temperatures, the fourth function being an approximate model of an effective drive current of the transistor at a typical-typical process corner; generating a fifth function, the fifth function being a function of: the plurality of design parameters; the first design parameter; and the plurality of operating temperatures, the fifth function being a model of an effective drive current of the transistor at a slow-slow process corner; and generating a sixth function, the sixth function being a function of: the plurality of design parameters; the first design parameter; and the sixth function being a model of a minimum, over the operating temperatures of the plurality of operating temperatures, of the effective drive current of the transistor at the slow-slow process corner, the seventh function being the sixth function with the first design parameter supplied by a call to the third function.

According to an embodiment of the present invention there is provided a method for fabricating a transistor meeting a leakage current specification at a plurality of operating temperatures, the method including: evaluating a seventh function of a plurality of design parameters, the seventh function being a model of a minimum, over the operating temperatures of the plurality of operating temperatures, of an effective drive current of the transistor: at a slow-slow process corner; and at a value of a first design parameter, the first design parameter not being one of the plurality of design parameters, for which a modeled leakage current equals the leakage current specification; over a plurality of sets of values of the plurality of design parameters; finding a first set of design parameter values for which the seventh function has the greatest value; and fabricating the transistor, the transistor having, as design parameters, the first set of design parameter values for the plurality of design parameters.

In one embodiment, the evaluating of the seventh function includes evaluating a response surface methodology model of leakage current and evaluating a response surface methodology model of effective drive current.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of exemplary embodiments of a method for transistor design provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Technology computer aided design (TCAD) simulations may be used in designing transistors. These simulations may involve simulating, in separate acts, (i) fabrication processes and (ii) devices that are fabricated by such processes, and may use a calibrated TCAD deck, e.g., a file that specifies aspects of the process to the simulation software. In some embodiments, as described in further detail below, a design's "worst-case" performance may be evaluated at a fixed worst-case leakage target, using technology computer aided design simulations for each design point in the design space. Using this approach, a design point which offers the best "worst-case" performance at the targeted "worst-case" leakage current may be obtained. In some embodiments, response surface methodology (RSM) models are used to significantly reduce the simulation time while maintaining high accuracy. With this TCAD-based, full-PVT design approach, a fully automated flow may be created to obtain an optimum transistor design for semiconductor technology development.

In a fabrication process, process variations may result in several process corners, including a typical-typical (TT) corner, which is the nominal case (without any process variations), a fast-fast (FF) corner, which exhibits higher performance (e.g., higher effective drive current (Ieff)) and higher leakage current (e.g., higher Isoff) than the nominal case, and a slow-slow (SS) corner, which exhibits lower performance (e.g., lower Ieff) and lower leakage current (e.g., lower Isoff) than the nominal case. Process variations may result in performance and leakage current varying together, e.g., if the principal effect of a process variation is a change in threshold voltage; a lower threshold voltage may for example result in both higher effective drive current and higher leakage current.

Supply voltage (VDD) variations may be ±10% of the nominal supply voltage, and characteristics of the transistor within a certain temperature range (e.g., from −40° C. to 125° C.) may be of interest. (The nominal transistor performance is measured at the room temperature, i.e., 25° C.)

Worst-case PVT conditions may correspond to different circumstances, depending on the criterion. For example, for leakage current (Isoff), the worst case combination may be the fast-fast process corner, the maximum operating voltage (e.g., 1.1 VDD) and the highest temperature, e.g., 125° C. For performance, i.e., when the criterion is maximizing the effective drive current (Ieff), the worst case combination may correspond to (i) the slow-slow process corner, (ii) the lowest supply voltage within the range of supply voltage variations (e.g., 0.9 VDD), and (iii) any of the operating temperatures, e.g., −40° C., 125° C., or 25° C. (because increasing temperature may result in a lower threshold voltage, and also in a lower mobility).

Figure 1A:
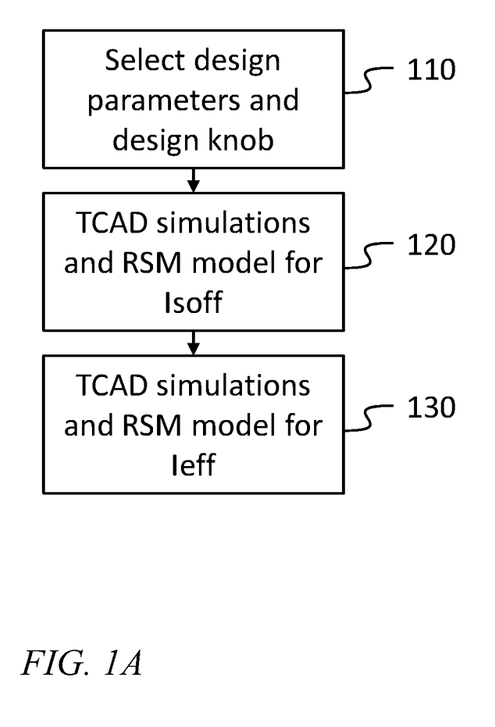
FIG. 1A is a flow chart of a method for designing a transistor, according to an embodiment of the present invention.

In some embodiments, a process for selecting design parameters for a process may proceed as follows, beginning with a calibrated TCAD deck. Referring to FIG. 1A, in a first act 110, a set of device design parameters $\{p\}=[p_1, p_2, p_N]$ (e.g., [Lg, Tsi, NSD, ...]), is identified (where Lg is the length of a transistor gate, Tsi is the silicon body thickness of a thin body double gate metal oxide semiconductor field effect transistor (MOSFET), and NSD is the source drain doping concentration). The bounds (e.g., a lower specification limit (LSL) and an upper specification limit (USL)) for each $p_i$ may then be set, and a 3-σ variation specification ($\Delta p_i$) may also be set for each device design parameter $p_i$. An additional design parameter (e.g., the channel doping or the gate work function) is chosen as a "design knob" kb, that is adjusted to meet a criterion (e.g., the leakage current (e.g., Isoff)), as discussed in further detail below. The design knob kb may be selected to be a design parameter such that the leakage current is a monotonic function of the design knob. As used herein, a "monotonic function" is a function which is either entirely nonincreasing or entirely nondecreasing over the domain of the function (i.e., over the range of values that the argument—the design knob—may take).

In a second act 120, TCAD simulations are performed at 1.1 VDD and at 125° C. in the design space ({p}, kb). Sampling methods such as central composite design (CCD) may be used to select parameter values in the design space for these simulations. An RSM model is then built for Isoff (i.e., the leakage current measured at the source of the MOSFET) at the typical-typical (TT) process corner, and then extended to cover Isoff at the fast-fast (FF) process corner, as described in further detail below. This model is then used to calculate the kb value, for each {p} (i.e., for each of the $p_i$), that results in just meeting the worst-case Isoff target.

Figure 1B:
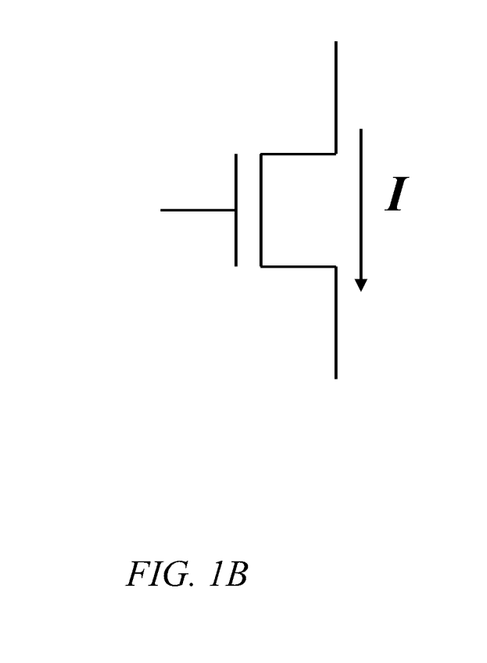
FIG. 1B is a schematic diagram of a transistor, according to an embodiment of the present invention.

In a third act 130, TCAD simulations are performed in the design space ({p}, kb) at 0.9 VDD for operating temperatures of 125° C., 25° C., and −40° C. Sampling methods such CCD may be used to select parameter values in the design space for these simulations. An RSM model is then built for Ieff at the typical-typical (TT) process corner, and then extended to cover Ieff at the slow-slow (SS) process corner, as described in further detail below. This model is then used to search for the optimum design point {p} that offers the highest worst-case Ieff at the targeted worst-case leakage current. A transistor, such as that shown in FIG. 1B, may then be fabricated using a fabrication process with the parameters of the optimum design point and the design knob. The current I shown in FIG. 1B may, depending on the gate voltage, be the leakage current Isoff, or, an average over several different values of the current I may be the effective drive current.

Figure 2:
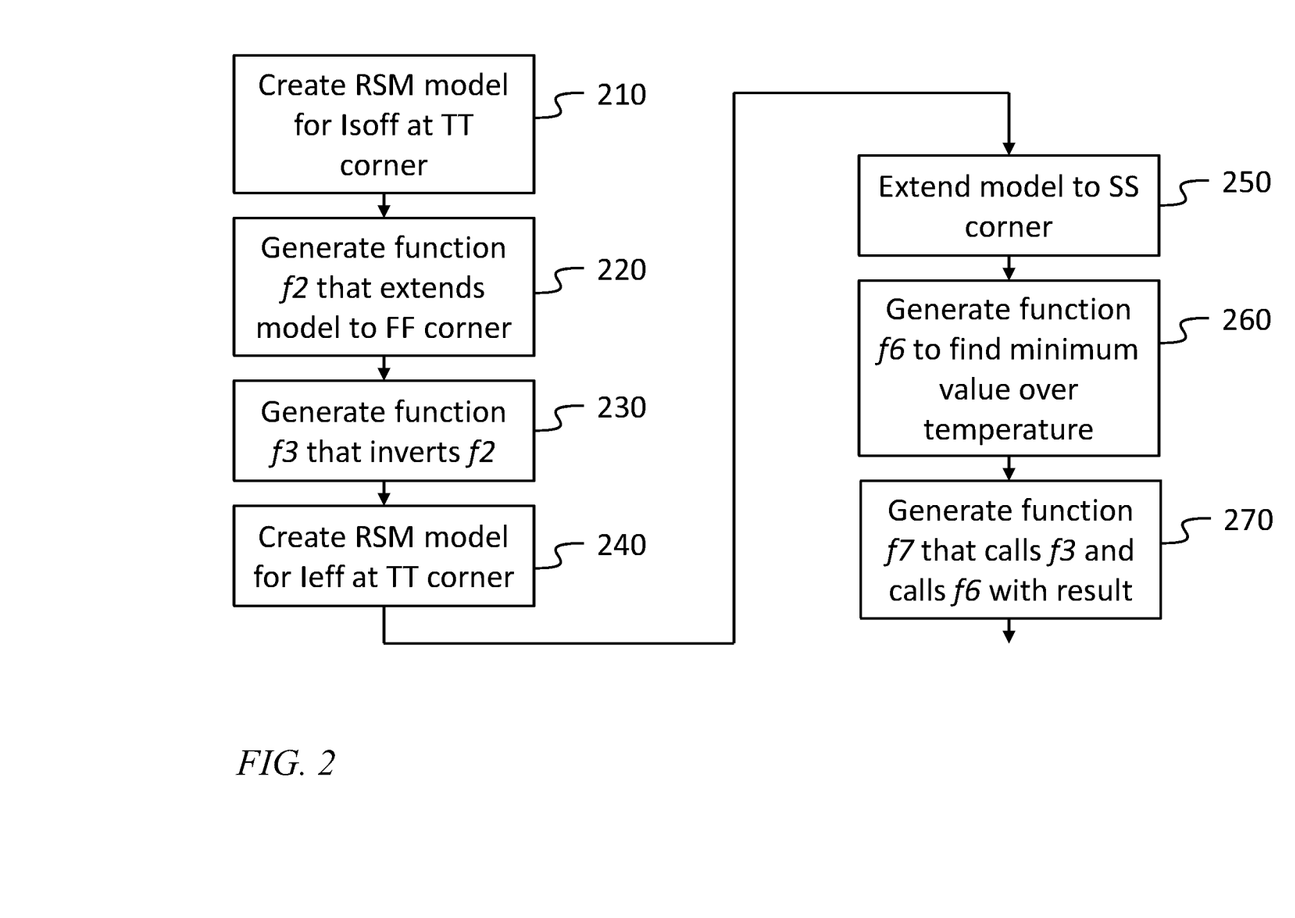
FIG. 2 is a flow chart of a method for designing a transistor, according to an embodiment of the present invention.

In some embodiments, the above-summarized acts proceed as described in greater detail in the following. At 1.1 VDD and 125° C., based on the TCAD results (with a sampling method such as CCD), an RSM model (e.g., 2nd-order regression) is, in a first act 210, created for Isoff of a transistor at the typical-typical (TT) process corner. As used herein the leakage current (or the effective drive current) of a transistor "at a process corner" refers to the leakage current (or the effective drive current) that a transistor fabricated with process parameters corresponding to the process corner would exhibit. The RSM model may be an approximate model of the leakage current (in the sense that it may be a second-order approximation of the TCAD results) and may be represented as follows:

$$Isoff@TT=f1(\{p\},kb)$$

The function $f1(\{p\}, kb)$ may for example be a software function generated by manual coding, or by a suitable autocoding tool.

Numerical partial derivatives of the function $f1$ may then be calculated to extend the model to a neighborhood of the typical-typical (TT) process corner. For example, the process-induced Isoff variations may be calculated using the following equation for $[\Delta \log(Isoff)]^2$:

$$[\Delta \log(Isoff)]^2 = \Sigma_i \left[\frac{\partial \log(Isoff@TT)}{\partial p_i}\Delta p_i\right]^2 + \left[\frac{\partial \log(Isoff@TT)}{\partial kb}\Delta kb\right]^2$$

where $\Delta pi$ and $\Delta kb$ are the 3-$\sigma$ variation specs for $p_i$ and kb, respectively, and the partial derivatives are obtained numerically from the RSM model, as mentioned above. From this equation it follows that the leakage current offset $\Delta \log(Isoff)$ may be calculated as the quadrature sum of a plurality of products, each being a product of (i) a partial derivative of the logarithm of the leakage current with respect to an independent variable, and (ii) the variation (e.g. the 3-$\sigma$ variation spec) of the independent variable. As used herein, the "quadrature sum" of a plurality of terms is the square root of the sum of the squares of the terms.

Because $\log(Isoff@FF)=\log(Isoff@TT)+\Delta \log(Isoff)$, a function $f2$ may be generated, in an act 220, using the above equation for $[\Delta \log(Isoff)]^2$, such that $Isoff@FF=f2(\{p\}, kb)$, i.e., the function $f2$ may be a model for the value of Isoff at the fast-fast (FF) process corner, as a function of the design space variables ($\{p\}$, kb).

For each given $\{p=p0\}$, this model (i.e., the function $f2$) may be numerically inverted (e.g., using a numerical root-finding algorithm), in an act 230, to solve for the value of kb for which Isoff is equal to the target (maximum acceptable) Isoff, referred to herein as Isoff_target. This process may be written symbolically as solving $f2(\{p0\}, kb)=Isoff\_target$ to find kb; this may generate a function $f3$ of $\{p\}$, $kb=f3(\{p\})$ where the function $f3$ may for example include a root-finding algorithm that makes repeated calls to the function $f2$, to find its inverse at a given $\{p\}$ with a specified precision.

An RSM model for Ieff at the typical-typical (TT) process corner may then be created, in an act 240, at 0.9 VDD and at each of the temperatures (T) of T=125° C., 25° C., and −40° C., based on the TCAD results. This RMS model may be an approximate model of the effective drive current (in the sense that it may be a second-order approximation of the TCAD results) may be represented by the function $f4$, as follows:

$$Ieff@TT=f4(\{p\},kb,T=125° C.,25° C.,-40° C.)$$

The process-induced Ieff variations may then be calculated using the following equation:

$$[\Delta Ieff]^2 = \Sigma_i \left[\frac{\partial Ieff@TT}{\partial p_i}\Delta p_i\right]^2 + \left[\frac{\partial Ieff@TT}{\partial kb}\Delta kb\right]^2$$

where the partial derivatives are again obtained numerically from the RSM model, and where the Ieff offset $\Delta$Ieff is the quadrature sum of a plurality of products, each being a product of (i) a partial derivative of the effective drive current with respect to an independent variable, and (ii) the variation (e.g. the 3-$\sigma$ variation spec) of the independent variable.

Because $Ieff@SS=Ieff@TT-\Delta Ieff$, a function $f5$ may be generated, in an act 250, using the above equation for $[\Delta Ieff]^2$, such that $Ieff@SS=f5(\{p\}, kb, T=125, 25, -40)$ i.e., the function $f5$ may be a model for the variation of Ieff at the slow-slow (SS) process corner, as a function of the design space variables ($\{p\}$, kb), and of the discrete temperature variable T (which may take any of the three values 125° C., 25° C., −40° C.).

The worst-case Ieff (referred to as Ieff_WC), i.e., the smallest value of Ieff, may be found, in an act 260, for each design point ($\{p\}$, kb), and the result may be referred to as $f6$, i.e., it may be written:

$$Ieff\_WC=f6(\{p\},kb)=\min[f5(\{p\},kb,T)] \text{ for } T=125° C.,25° C.,-40° C.$$

As described above, the value of kb for which Isoff just meets the worst-case Isoff target may be determined from the function $f3$, i.e., to just meet the worst-case Isoff target, $kb=f3(\{p\})$. Accordingly, the expression for Ieff_WC may be written (substituting ($f3(\{p\})$ for kb), to generate, in an act 270, a seventh function $f7$, that is a function only of the design parameters $\{p\}$:

$$Ieff\_WC=f6[\{p\},f3(\{p\})]=f7(\{p\})$$

This expression may be used to find the worst case effective drive current Ieff at any point in the design space $\{p\}$, assuming that kb is chosen at each point so that the worst-case Isoff target is just met.

The whole design space may then be sampled, by repeated calls to the function $f7$, to obtain the design point $\{p\_opt\}$ which offers the maximum Ieff_WC, i.e., which satisfies:

$$f6[\{p\_opt\},f3(\{p\_opt\})]=f7(\{p\_opt\})=\max(Ieff\_WC).$$

Because of the analytical nature of the RSM-based models, the execution time of these models may be small and, for example, it may be possible to complete millions of runs in less than a minute on a high performance server. As a result it may be feasible to use a brute-force method (e.g., full-factorial sweep or Genetic Algorithm) in the above acts to search for the optimum design point in the design space ($\{p\}$, kb).

In view of the foregoing, a method for designing a transistor may include generating a second function (e.g., the second function $f2$) that is a second order RSM model for the leakage current at the fast-fast process corner, generating a third function ($f3$) that inverts the second function to return a value of a design knob (i.e., an adjustable parameter) that corresponds to a specified leakage current at the fast-fast process corner, generating a sixth function ($f6$) that is a worst case value, over a set of operating temperatures, of a second order RSM model for the effective drive current at a slow-slow process corner, and a seventh function ($f7$) that substitutes, for a design knob input of the sixth function, the output of the third function ($f3$). The seventh function is then used to search the design parameter space to find the set of design parameters resulting in the greatest worst case effective drive current, subject to the constraint that the leakage current at the fast-fast process corner is the specified leakage current.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a method for transistor design have been specifically described and illustrated herein, many modifications and variations will be apparent to those skilled in the art. Accordingly, it is to be understood that a method for transistor design constructed according to principles of this invention may be embodied other than as specifically described herein. The invention is also defined in the following claims, and equivalents thereof.

What is claimed is:

1. A method for fabricating a transistor meeting a leakage current specification at a plurality of operating temperatures, the method comprising:
    generating a third function,
        the third function being a function of a first plurality of design parameters,
        the third function being configured to return a value of a first design parameter,
            the first design parameter not being one of the first plurality of design parameters,
        the value returned by the third function being a value of the first design parameter for which a modeled leakage current equals the leakage current specification;
    generating a seventh function,
        the seventh function being a function of the first plurality of design parameters,
        the seventh function being a model of a minimum, over the operating temperatures of the plurality of operating temperatures, of an effective drive current of the transistor:
            at a fast-fast process corner; and
            at a value of the first design parameter for which a modeled leakage current equals the leakage current specification;
    finding a first set of respective values for the first plurality of design parameters for which the seventh function has a greatest value; and
    fabricating the transistor, the transistor having, as design parameters:
        the first set of respective values, for the first plurality of design parameters; and
        a value returned by the third function evaluated at the first set of respective values for the first plurality of design parameters, for the first design parameter,
    the generating of the third function comprising generating a first function,
        the first function being a function of:
            the first plurality of design parameters; and
            the first design parameter, the first function being an approximate model of a leakage current of the transistor at a typical-typical process corner, wherein the generating of the first function comprises:
performing a plurality of technology computer aided design simulations, each resulting in a simulated leakage current; and
generating a response surface methodology model to fit the results of the plurality of technology computer aided design simulations.

2. The method of claim 1, wherein the generating of the third function further comprises:
generating a second function,
the second function being a function of:
the first plurality of design parameters; and
the first design parameter,
the second function being a model of the leakage current at a fast-fast process corner,
the third function returning a value of the first design parameter for which the second function returns a value equal to the leakage current specification.

3. The method of claim 2, wherein the generating of the seventh function comprises:
generating a fourth function,
the fourth function being a function of:
the first plurality of design parameters;
the first design parameter; and
the plurality of operating temperatures,
the fourth function being an approximate model of an effective drive current of the transistor at a typical-typical process corner;
generating a fifth function,
the fifth function being a function of:
the first plurality of design parameters;
the first design parameter; and
the plurality of operating temperatures,
the fifth function being a model of an effective drive current of the transistor at a slow-slow process corner; and
generating a sixth function,
the sixth function being a function of:
the first plurality of design parameters;
the first design parameter; and
the sixth function being a model of a minimum, over the operating temperatures of the plurality of operating temperatures, of the effective drive current of the transistor at the slow-slow process corner,
the seventh function being the sixth function with the first design parameter supplied by a call to the third function.

4. The method of claim 3, wherein the generating of the response surface methodology model comprises performing a second order regression fit to results of the plurality of technology computer aided design simulations.

5. The method of claim 4, wherein the generating of the second function comprises:
calculating a plurality of numerical partial derivatives of a logarithm of the first function with respect to each of a plurality of respective independent variables, the plurality of respective independent variables including each of the first plurality of design parameters and the first design parameter; and
calculating an estimated variation in a logarithm of the leakage current from the numerical partial derivatives.

6. The method of claim 5, wherein the calculating of the estimated variation in a logarithm of the leakage current comprises calculating a quadrature sum of each of a plurality of products, each of the products being a product of:
a partial derivative and
an estimated variation in an independent variable of the partial derivative.

7. The method of claim 6, wherein the generating of the second function further comprises calculating a leakage current offset, the calculating of the leakage current offset comprising calculating an inverse logarithm of the quadrature sum.

8. The method of claim 7, wherein the generating of the fifth function comprises:
performing a plurality of technology computer aided design simulations, each resulting in a simulated effective drive current, and
generating a response surface methodology model to fit the results of the plurality of technology computer aided design simulations.

9. The method of claim 8, wherein the generating of the response surface methodology model comprises performing a second order regression fit to results of the plurality of technology computer aided design simulations.

10. The method of claim 2, wherein the first design parameter is a channel doping concentration.

11. The method of claim 2, wherein the first design parameter is a gate work function.

12. The method of claim 1, wherein the first plurality of design parameters includes:
a length of a transistor gate;
a silicon body thickness; and
a source drain doping concentration.

13. The method of claim 1, wherein the modeled leakage current varies monotonically as a function of the first design parameter.

14. A method for fabricating a transistor meeting a leakage current specification at a plurality of operating temperatures, the method comprising:
performing a first plurality of technology computer aided design simulations, for a first plurality of sets of values for:
a first plurality of design parameters; and
a first design parameter, the first design parameter not being one of the first plurality of design parameters,
the first plurality of technology computer aided design simulations resulting in a plurality of respective simulated leakage currents;
generating a third function, from the plurality of respective simulated leakage currents, the third function being configured to return a value of the first design parameter for which an estimated leakage current value at a fast-fast process corner is equal to the leakage current specification, the generating of the third function comprising:
generating a first function,
the first function being a function of:
the first plurality of design parameters; and
the first design parameter,
the first function being an approximate model of a leakage current of the transistor at a typical-typical process corner;
the generating of the first function comprising:
generating a response surface methodology model to fit the plurality of respective simulated leakage currents;
performing a second plurality of technology computer aided design simulations, for a second plurality of sets of values, the second plurality of technology computer aided design simulations resulting in plurality of respective simulated effective drive currents;

generating, from the plurality of respective simulated effective drive currents, a seventh function, the seventh function being a function of the first plurality of design parameters;

the seventh function being a model of a minimum, over the operating temperatures of the plurality of operating temperatures, of an effective drive current of the transistor:
- at a slow-slow process corner; and
- at a value of the first design parameter for which a modeled leakage current equals the leakage current specification;

finding a first set of design parameter values for which the seventh function has a greatest value; and fabricating the transistor, the transistor having, as design parameters:
- the first set of design parameter values for the first plurality of design parameters, and
- the value returned by the third function evaluated at the first set of design parameter values, for the first design parameter.

15. The method of claim 14, wherein the generating of the third function further comprises:

generating a second function,
- the second function being a function of:
  - the first plurality of design parameters; and
  - the first design parameter,
- the second function being a model of the leakage current at a fast-fast process corner, the third function returning a value of the first design parameter for which the second function returns a value equal to the leakage current specification.

16. The method of claim 15, wherein the generating of the seventh function comprises:

generating a fourth function,
- the fourth function being a function of:
  - the first plurality of design parameters;
  - the first design parameter; and
  - the plurality of operating temperatures,
- the fourth function being an approximate model of an effective drive current of the transistor at a typical-typical process corner;

generating a fifth function,
- the fifth function being a function of:
  - the first plurality of design parameters;
  - the first design parameter; and
  - the plurality of operating temperatures,
- the fifth function being a model of an effective drive current of the transistor at a slow-slow process corner; and generating a sixth function,
- the sixth function being a function of:
  - the first plurality of design parameters;
  - the first design parameter; and
- the sixth function being a model of a minimum, over the operating temperatures of the plurality of operating temperatures, of the effective drive current of the transistor at the slow-slow process corner, the seventh function being the sixth function with the first design parameter supplied by a call to the third function.

17. A method for fabricating a transistor meeting a leakage current specification at a plurality of operating temperatures, the method comprising:

generating a third function,
- the third function being a function of a first plurality of design parameters,
- the third function being configured to return a value of a first design parameter,
- the first design parameter not being one of the first plurality of design parameters,
- the value returned by the third function being a value of the first design parameter for which a modeled leakage current equals the leakage current specification, the generating of the third function comprising generating a first function;

evaluating a seventh function of the first plurality of design parameters,
- the seventh function being a model of a minimum, over the operating temperatures of the plurality of operating temperatures, of an effective drive current of the transistor:
  - at a slow-slow process corner; and
  - at a value of a first design parameter,
    - the first design parameter not being one of the first plurality of design parameters,
    - for which a modeled leakage current equals the leakage current specification;
- over a plurality of sets of values of the first plurality of design parameters;

finding a first set of design parameter values for which the seventh function has a greatest value; and fabricating the transistor, the transistor having, as design parameters, the first set of design parameter values for the first plurality of design parameters, wherein the first function is a function of:
- the first plurality of design parameters; and
- the first design parameter,
- the first function being an approximate model of a leakage current of the transistor at a typical-typical process corner, wherein the generating of the first function comprises:
- performing a plurality of technology computer aided design simulations, each resulting in a simulated leakage current; and
- generating a response surface methodology model to fit the results of the plurality of technology computer aided design simulations.

18. The method of claim 17, wherein the evaluating of the seventh function comprises evaluating a response surface methodology model of leakage current and evaluating a response surface methodology model of effective drive current.

* * * * *